United States Patent
Leary et al.

(10) Patent No.: US 10,088,077 B2
(45) Date of Patent: Oct. 2, 2018

(54) APPARATUS AND METHODS FOR INSERTION OF GASKETS

(71) Applicant: Flange Skillets International, LLC., Kissimmee, FL (US)

(72) Inventors: Steven Leary, Winter Park, FL (US); Margaret Fitzgerald, Winter Park, FL (US)

(73) Assignee: Flange Skillets International, LLC, Kissimmee, FL (US)

( * ) Notice: Subject to any disclaimer, the term of this patent is extended or adjusted under 35 U.S.C. 154(b) by 682 days.

(21) Appl. No.: 14/080,347

(22) Filed: Nov. 14, 2013

(65) Prior Publication Data

US 2015/0130139 A1    May 14, 2015

(51) Int. Cl.
| | |
|---|---|
| *B23Q 1/00* | (2006.01) |
| *F16L 1/26* | (2006.01) |
| *F16L 23/00* | (2006.01) |
| *B25B 27/00* | (2006.01) |
| *B25B 27/16* | (2006.01) |

(52) U.S. Cl.
CPC ............ *F16L 1/26* (2013.01); *B25B 27/0028* (2013.01); *B25B 27/16* (2013.01); *F16L 23/003* (2013.01)

(58) Field of Classification Search
CPC ............... B23Q 1/00; B23Q 3/00; B23Q 5/00
See application file for complete search history.

(56) References Cited

U.S. PATENT DOCUMENTS

| | | | |
|---|---|---|---|
| 1,896,795 A | 2/1933 | Kendall | |
| 3,730,537 A | 5/1973 | Ward et al. | |
| 4,495,689 A | 1/1985 | Lawrence et al. | |
| 5,116,340 A * | 5/1992 | Songer | A61B 17/8861 29/282 |
| 7,942,878 B2 * | 5/2011 | Fernandez | A61B 17/82 269/3 |
| 8,266,775 B2 * | 9/2012 | Bentley | B25B 7/02 29/268 |
| 8,728,087 B2 * | 5/2014 | Soliman | A61B 17/158 269/3 |
| 2006/0101634 A1 * | 5/2006 | Sweeney | B41F 17/26 29/468 |
| 2008/0282851 A1 * | 11/2008 | Engvall | B25B 7/123 81/357 |
| 2009/0145269 A1 * | 6/2009 | Cleland | B25B 7/12 81/367 |
| 2011/0167607 A1 | 7/2011 | Vidrine et al. | |
| 2014/0000085 A1 * | 1/2014 | Teller | B25B 7/123 29/426.6 |
| 2015/0130139 A1 * | 5/2015 | Leary | F16L 1/26 277/314 |

FOREIGN PATENT DOCUMENTS

| | | |
|---|---|---|
| WO | 2007083203 A2 | 7/2007 |
| WO | 2013109286 A1 | 7/2013 |

* cited by examiner

*Primary Examiner* — Lee D Wilson
(74) *Attorney, Agent, or Firm* — Jason P. Mueller; Adams and Reese LLP (57) ABSTRACT

A gasket insertion cradle with a bottom frame portion configured to align a gasket between opposing flanges of a flange assembly and capable of being removed from the flange assembly by simply rotating the frame portion free once the gasket is within ring grooves of the opposing flanges. Gasket insertion devices may have a top portion hinged to the cradle and configured to secure a gasket between the top portion and the cradle during installation.

11 Claims, 10 Drawing Sheets

APPARATUS AND METHODS FOR INSERTION OF GASKETS

FIELD

The invention relates generally to apparatuses and methods for insertion of gaskets and, more particularly, to an apparatus for and a method of inserting sealing gaskets between flange connectors of adjacent pipe sections of underwater pipe line sections.

BACKGROUND

In laying underwater pipelines, divers or remotely operated vehicles ("ROV"s) are often utilized to bolt together opposing connector flanges of adjacent pipe sections. Gas and fluid sealing gaskets are typically installed between the flanges. In order to do so, the divers, either directly or through the use of an ROV, often must hold opposing connector flanges in a relatively stationary position in order to insert the fluid sealing gasket between these opposing flanges prior to completing the bolting operations that will join these opposing flanges together.

Some flange assemblies, such as American National Standards Institute (ANSI) specified ring-type joint (RTJ) flange assemblies, are designed such that there is a space or gap between the flange faces to allow all or a portion of a gasket insertion device to remain in the completed assembly once the gasket is in place. However, other types of RTJ flange assemblies, such as the American Petroleum Institute (API) specified (S)BX flange assemblies and "compact flange" assemblies, which use an SPO or IX/HX gasket, do not have a space or gap between the flange faces. These types of flanges may have a ring groove within which a gasket sits when properly aligned with opposing flanges. In such situations, gasket insertion devices that are designed to leave a portion of the device inside of the flange assembly after placement of the gasket cannot be used because there is no gap to accommodate the remaining portion of the device.

When making the bolted connections between opposing flanges, a diver must guard against having his hands caught between the flanges of these adjacent pipe segments to avoid injury. Gasket insertion devices have been utilized to hold the sealing gaskets in a desired position between the opposing flanges to guard against injury to the fingers and hands of the diver and to avoid damage to the gaskets. In order to ensure placement of the gaskets, the gasket insertion devices must be aligned to a proper depth in the gap between faces of opposing flanges. Typically, alignment is accomplished by inserting alignment pins or bolts before securing the opposing flanges together.

It is desirable to have a gasket placement device that provides for easy gasket insertion and alignment without the need for separate placement pins or bolts for alignment.

SUMMARY

In an embodiment of the present invention, a gasket insertion apparatus is provided, having: a cradle, including a first member having a first curved surface; a top portion, including a second member having a second curved surface and a second arm connected to the second member and extending radially away from the second member; and a first arm connected to the first member and extending radially away from the first member. The cradle and the top portion are attached at a hinge point such that the top portion and the cradle rotate relative to each other. The first and second curved surfaces are opposite each other and are configured to secure a gasket there between.

The first member may have a bottom frame that is substantially flat and curved, the bottom frame having an interior edge inside the curvature of the bottom frame and an exterior edge outside the curvature of the bottom frame. The second member may have a top frame portion that is substantially flat and curved, the top frame portion having an interior edge inside the curvature of the top frame portion and an exterior edge outside the curvature of the top frame portion. A clamp wire may be configured to secure the cradle and the top portion in a closed position around the gasket. At least a portion of the first member may have a width configured to align the gasket within a flange assembly when the gasket is in contact with the first curved surface and the first member rests upon at least two connector bolts of the flange assembly. The width may be approximately equal to a distance between a bolt aperture and a ring groove of a flange of the flange assembly. The gasket insertion apparatus may include a hinge extension connected to a distal end of the first arm. The gasket insertion apparatus may include a hinge extension connected to a distal end of the second arm. The gasket insertion apparatus may include hinge apertures located in the hinge extension and a distal end of the second arm.

In an embodiment of the present invention, a gasket insertion apparatus is provided, having: a first member having: a bottom frame; and a first arm connected to the bottom frame and extending radially away from the bottom frame. The bottom frame has a first curved surface, the bottom frame having an interior edge inside the curvature of the first curved surface and an exterior edge outside the curvature of the first curved surface. The bottom frame is configured to align a gasket when the gasket is in contact with the interior edge of the first curved surface and the exterior edge of the first curved surface is in contact with at least two bottom connector bolts of a partially connected flange assembly.

The gasket insertion apparatus may include a top portion connected to the first member at a hinge point such that the top portion may rotate relative to the first member. The top portion may include: a top frame portion having a second curved surface, the top frame portion having an interior edge inside the curvature of the second curved surface and an exterior edge outside the curvature of the second curved surface. The top portion and the first member may be configured to secure a gasket there between. The gasket insertion apparatus may include a clamp wire configured to secure the first member and the top portion in a closed position around the gasket. The gasket insertion apparatus may include a hinge extension connected to a distal end of the first arm. The gasket insertion apparatus may include hinge apertures located in the hinge extension and a distal end of a second arm extending radially away from the top frame portion.

In an embodiment of the present invention, a method of installing a gasket in a flange assembly is provided, including: partially connecting opposing flanges of the flange assembly via at least two connector bolts at a bottom portion of the opposing flanges; placing a gasket insertion apparatus, having the gasket in contact therewith, between the opposing flanges until the gasket insertion apparatus rests upon the at least two connector bolts; further connecting the opposing flanges until the gasket is partially within at least one ring grove of the opposing flanges; rotating the gasket insertion apparatus until it no longer contacts the at least two connector bolts; removing the gasket insertion apparatus; and completing connection of the opposing flanges. The gasket insertion apparatus includes: a bottom frame; and a first arm connected to the bottom frame and extending radially away from the bottom frame. The bottom frame has a first curved surface, the bottom frame having an interior edge inside the curvature of the first curved surface and an exterior edge outside the curvature of the first curved surface. The bottom frame is configured to align a gasket when the gasket is in contact with the interior edge of the first curved surface and the exterior edge of the first curved surface is in contact with the at least two bottom connector bolts of a partially connected flange assembly.

The method may include a top portion connected to the bottom frame at a hinge point such that the top portion may rotate relative to the bottom frame. The method may include securing the gasket between the top portion and the bottom frame with a wire clamp. The method may include cutting the wire clamp after the gasket is partially within at least one ring groove of the flange assembly.

DETAILED DESCRIPTION

Embodiments of the present invention provide a gasket insertion cradle with a first member having a first curved surface and a first arm extending radially away from the first member. In embodiments of the present invention, an exterior edge of the first member may be placed upon connector bolts partially joining opposing flanges of a flange assembly such that a gasket placed upon an interior edge of the first member will align with the opposing flanges for installation. In embodiments of the present invention, the cradle may be used to align a gasket in a flange assembly as the opposing flanges are brought together. In embodiments of the present invention, the cradle may be rotated out of the flange assembly once the gasket is within at least one ring groove of the opposing flanges. Embodiments of the present invention may provide more secure engagement of large and/or heavy gaskets over top mounted apparatuses. Embodiments of the present invention may be used for large gaskets that cannot be efficiently secured and/or manipulated with top mounted apparatuses.

Embodiments of the present invention may include a top portion hinged to the cradle via a hinge extension and/or hinge bolt. In certain embodiments of the present invention, the top portion may include a top frame portion, which may have a second curved surface, a handle extension, a handle grip, and/or a second arm extending radially away from the top frame portion. The second arm may be hinged to the first arm of the cradle. The attachment of second arm and the cradle may be configured such that the top portion can be rotated relative to the cradle at a hinged point which may be a hinge bolt. Embodiments of the present invention may include a clamp wire attached to the top portion and attachable to the cradle such that a gasket may be secured between the cradle and the top portion. The clamp wire may be cut or disengaged from the cradle allowing the top portion to rotate relative to the cradle. The cradle may then be rotated out of the flange assembly. Once removed, joining of opposing flanges of the flange assembly may be completed. Embodiments of the present invention provide quicker, safer, and more efficient methods of aligning a gasket between opposing flanges of a flange assembly. Embodiments of the present invention may incorporate a handle grip which may permit manipulation of the apparatus by a diver directly or by an ROV.

Figure 1:
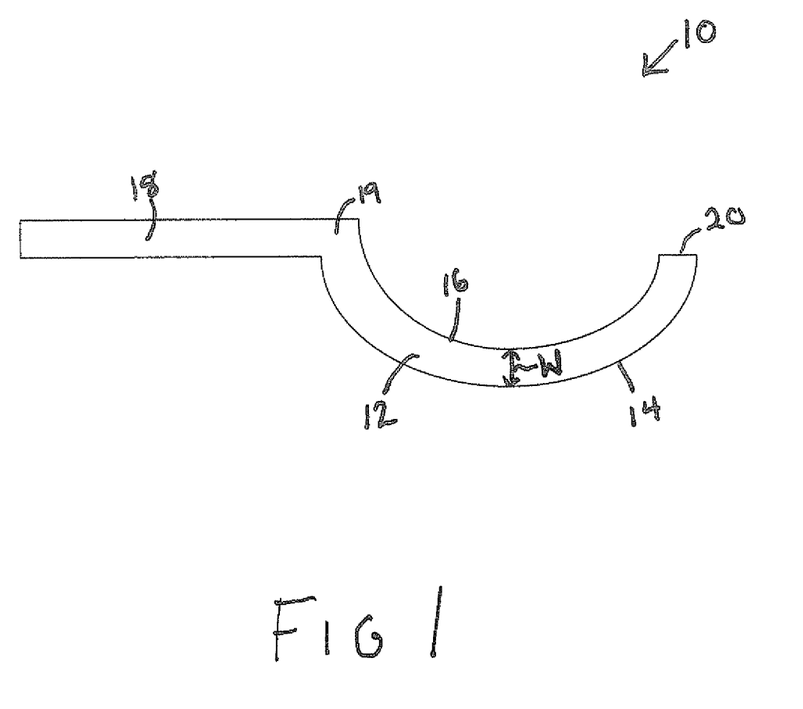
FIG. 1 is a front view of a gasket insertion apparatus according to an exemplary embodiment of the present invention.
Figure 1A:
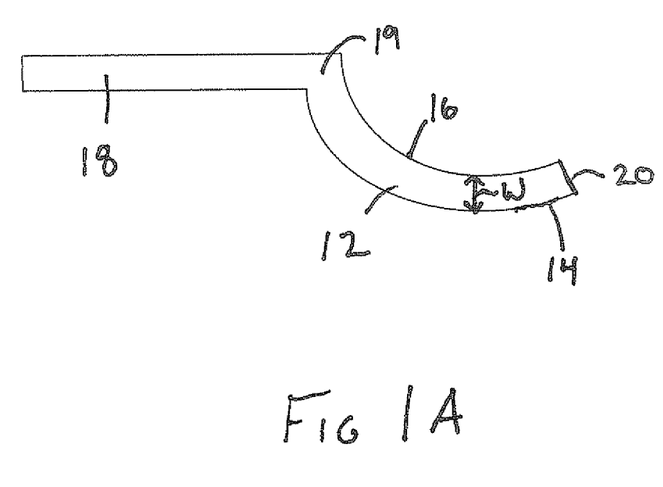
FIG. 1A is a front view of a gasket insertion apparatus according to an exemplary embodiment of the present invention.

FIG. 1 shows a front view of a cradle 10 according to an exemplary embodiment of the present invention. Cradle 10 includes a first member having a first curved surface. The first member may be bottom frame 12. Extending from the first member is first arm 18. As shown, first arm 18 extends radially from a first end 19 of the bottom frame 12. First arm 18 may permit manipulation of the cradle 10 by a diver or ROV. Bottom frame 12 has an exterior edge 14 and an interior edge 16. A width W between exterior edge 14 and interior edge 16 may be configured such that a gasket placed in contact with interior edge 16 is aligned with ring grooves 28 of opposing flanges of a flange assembly. See, e.g., FIG. 2. The first member may be bottom frame 12 having a curved surface forming all of bottom frame 12. Alternatively, the first curved surface may be only a portion of the first member. First end 19 and second end 20 of bottom frame 12 may substantially form a half-circle. Bottom frame 12 may be less than a half-circle to facilitate ease of removal of the cradle from a flange assembly. Bottom frame may form approximately a quarter circle. See, e.g., FIG. 1A. Bottom frame 12 may have various other curvatures and/or shapes configured to hold a gasket therein.

Figure 2:
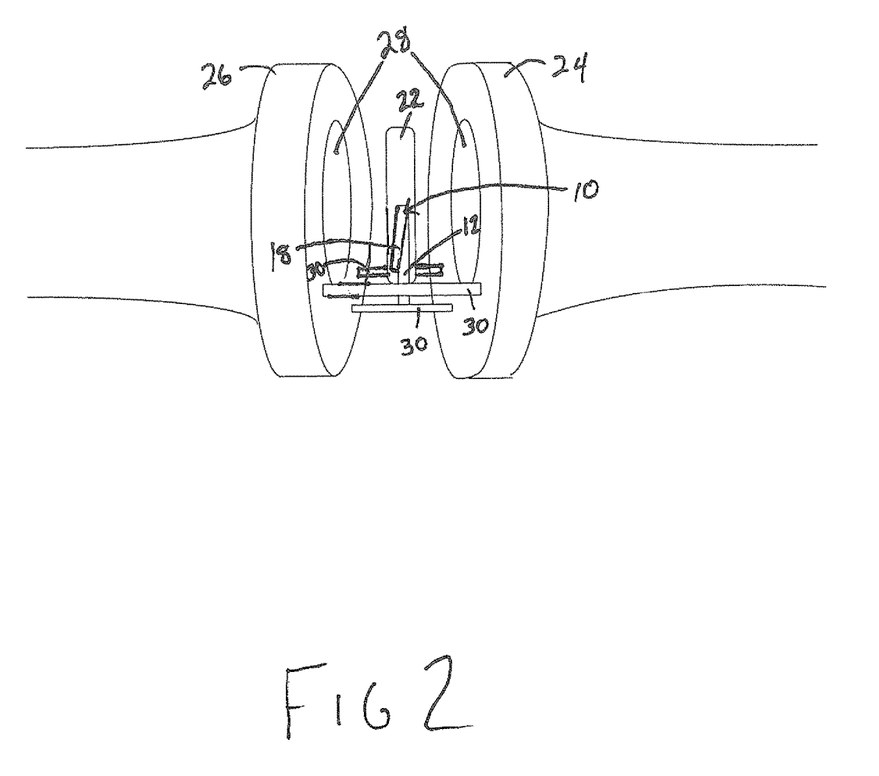
FIG. 2 is a modified side view of a gasket insertion apparatus placed between opposing flanges of a flange assembly where the opposing flanges are partially opened towards the side view according to an exemplary embodiment of the present invention.
Figure 3:
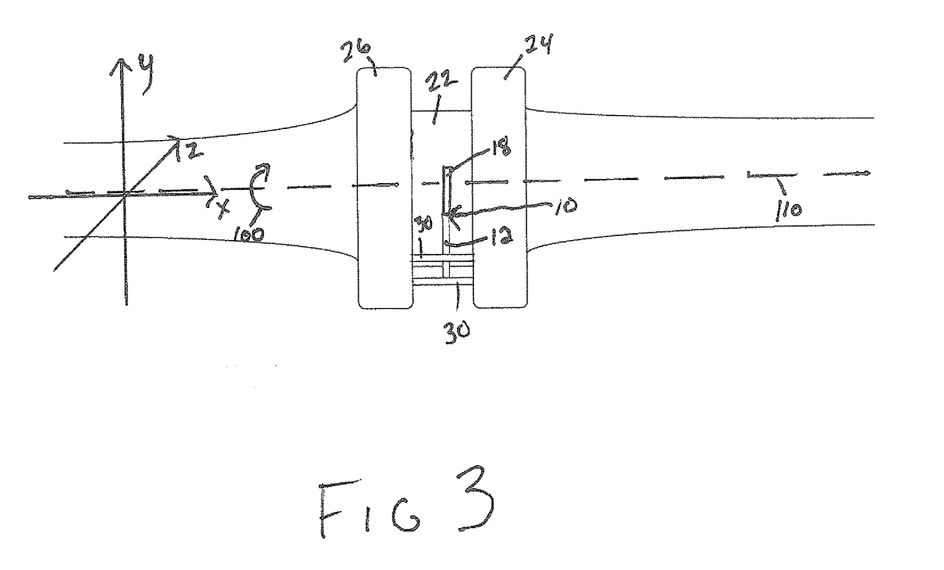
FIG. 3 is a side view of the gasket insertion apparatus shown in FIG. 2 wherein the flanges have been partially joined together according to an exemplary embodiment of the present invention.

FIG. 2 shows a cradle 10 holding a gasket 22 between first and second flanges 24 and 26 of a flange assembly. Bolts 30 join first and second flanges 24 and 26 at a bottom portion of the flange assembly and exterior edge 14 of the cradle 10 rests upon the bolts 30. As shown, when exterior edge 14 of the cradle 10 rests upon the bolts 30, gasket 22 is aligned with ring grooves 28. As bolts 30 are tightened to bring first and second flanges 24 and 26 closer together, gasket 22 fits into the ring grooves 28. Once the first and second flanges 24 and 26 are sufficiently close together that gasket 22 has partially fit within at least one of the ring grooves 28, cradle 10 may be rotated along a center axis 110 of the flange assembly using arm extension 18 until bottom frame 12 is no longer between gasket 22 and bolts 30. See, e.g., FIG. 3. Arrow 100 denotes the direction of rotation of cradle 10. If facing a face of flange 26, rotation of cradle 10 is clockwise. Cradle 10 may then be removed from the flange assembly and joining of the flanges may be completed.

Figure 4:
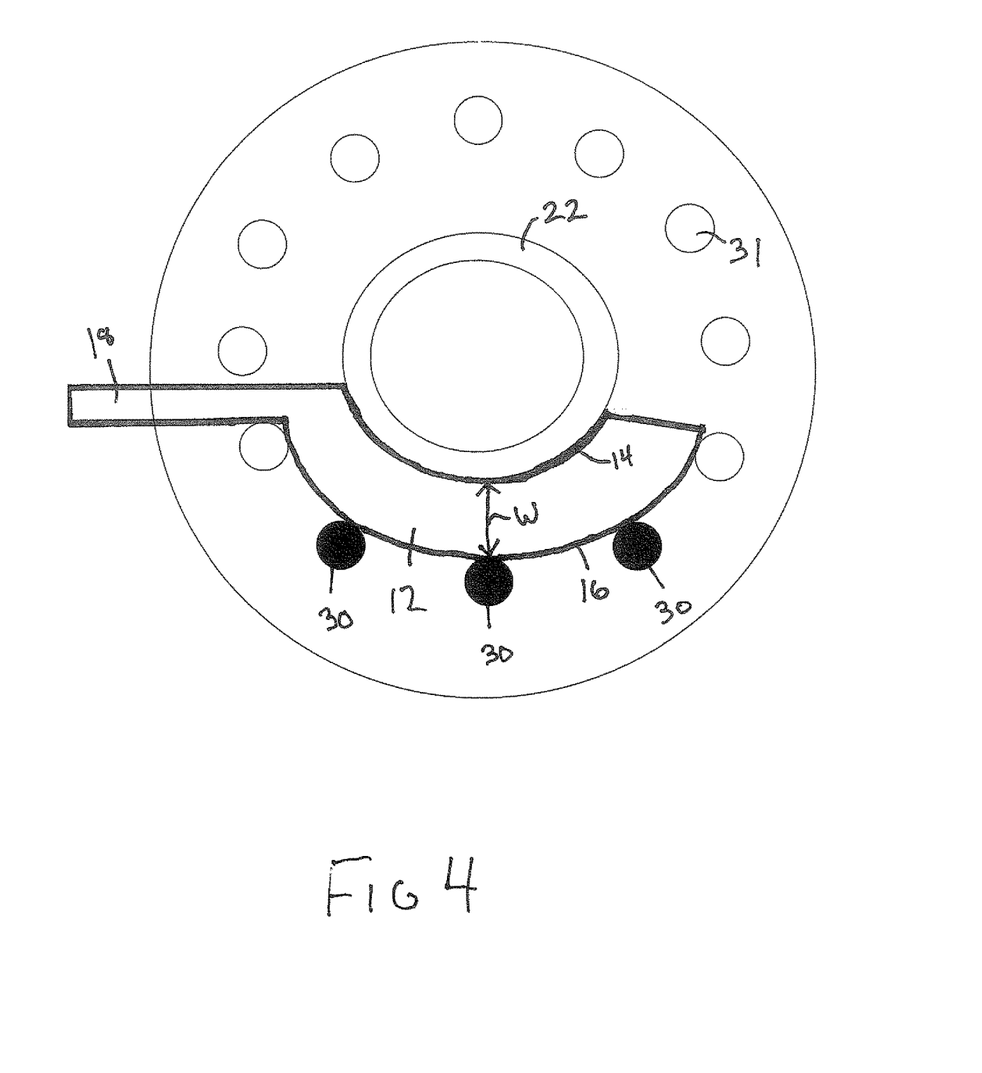
FIG. 4 is sectional view A of the gasket insertion apparatus and flange assembly shown in FIG. 3.

FIG. 4 shows a sectional view of a flange assembly where three bolts 30 have been passed through three bolt apertures of the flanges of the flange assembly, partially joining the flanges. As shown, cradle 10 may be placed in the flange assembly such that exterior edge 14 rests upon the bolts 30. In this position, width W of the bottom frame 12 is configured such that interior edge 16 aligns with a ring groove (not shown). Accordingly, when gasket 22 is placed upon interior edge 16 of the cradle 10, it is properly aligned for installation. Cradle 10 does not require any separate alignment pins or other equipment to align a gasket. Cradle 10 allows for efficient, quick and safe alignment of gaskets.

Embodiments of the present invention may include a top portion 236, which may be connected to cradle 210. See, e.g., FIGS. 5 to 9. Cradle 210 is substantially similar to cradle 10 and includes all of the features of cradle 10 disclosed herein. In these embodiments, cradle 210 may include a hinge extension 232 and a hinge bolt 234 connecting cradle 210 to top portion 236. Hinge bolt 234 may be a bolt, a pin, or any other connection allowing top portion 236 to rotate relative to cradle 210 where the axis of rotation is at or near hinge bolt 234. In alternative embodiments, hinge bolt may connect first arm 218 directly to top portion 236. Top portion 236 includes a substantially flat, curved top frame 246 having an interior edge 256 and an exterior edge 248. Top portion 236 also includes second arm 250 extending radially from an end of top frame 246. Second arm 250 and top frame 246 are configured such that top frame 246 and bottom frame 212 substantially form a circle or a partially open "C" when second arm 250 and first arm 218 are substantially parallel. See, e.g., FIGS. 6 and 7.

Figure 5:
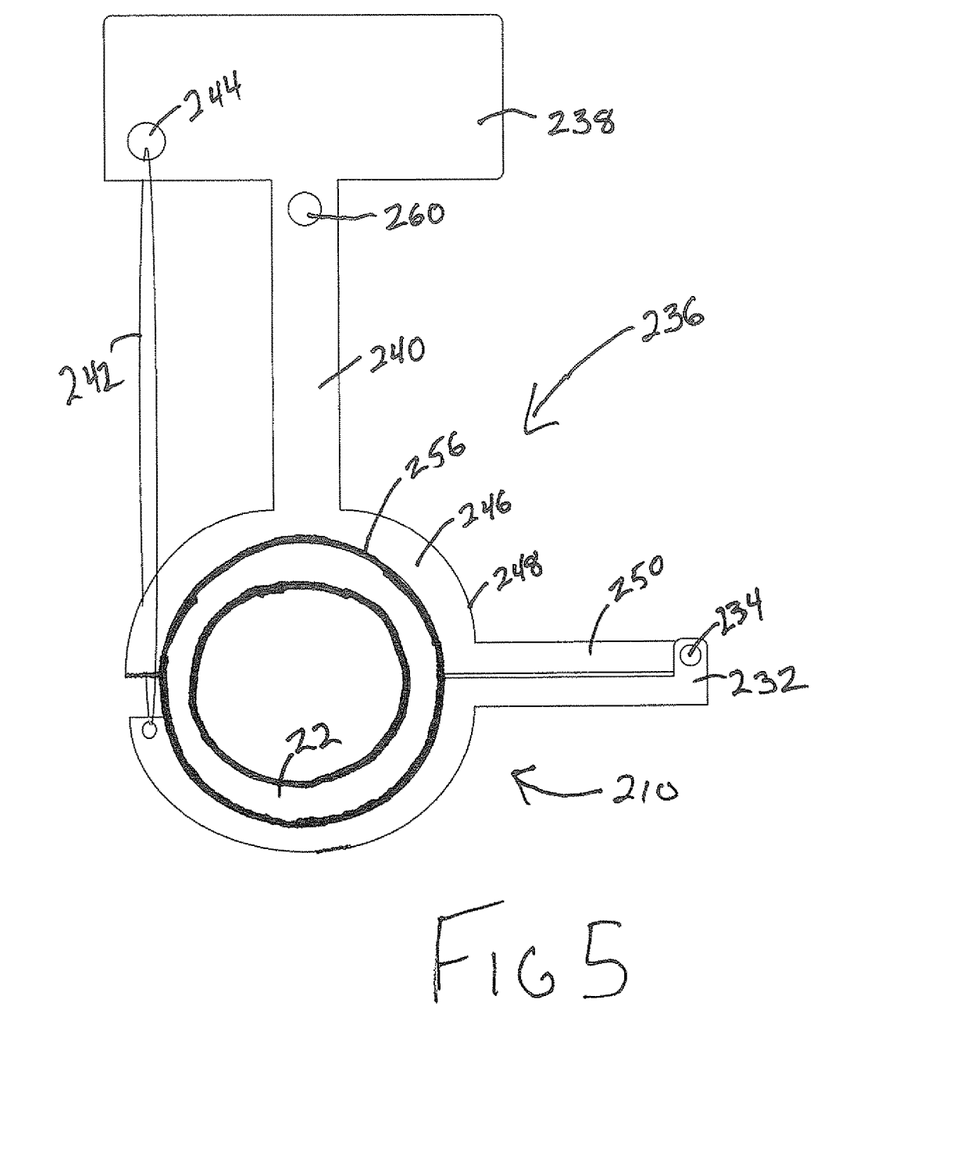
FIG. 5 is a front view of a gasket insertion apparatus having a gasket mounted therein according to an exemplary embodiment of the present invention.
Figure 6:
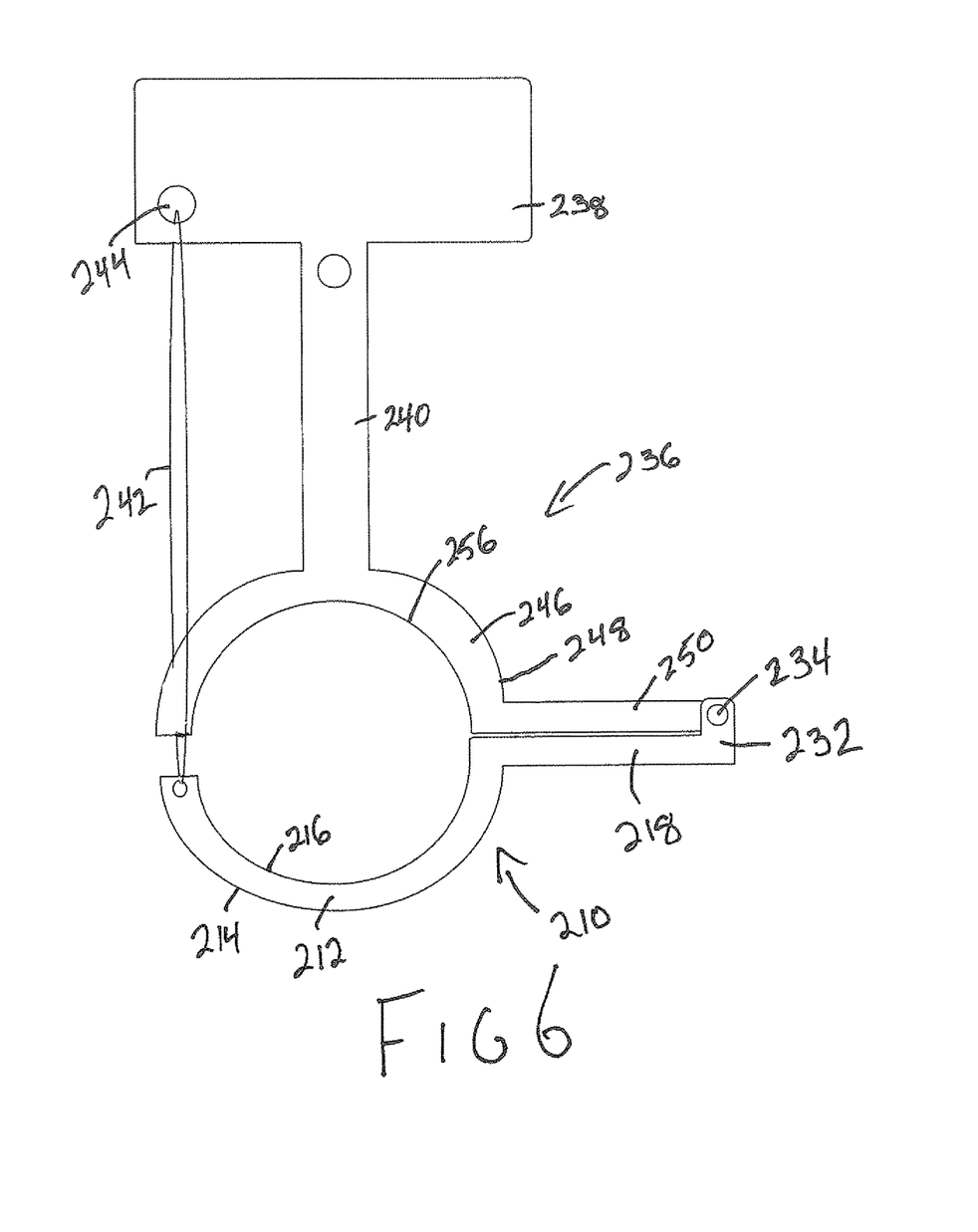
FIG. 6 is a front view of the gasket insertion apparatus of FIG. 5 wherein the gasket has been removed.

In embodiments of the present invention, top portion 246 may include handle extension 240 and handle grip 238. Handle extension 240 may include alignment pin aperture 260. Handle grip 238 may configured as shown in FIGS. 5 and 6 or may include configurations disclosed in U.S. patent application Ser. No. 13/354,911 and U.S. patent application Ser. No. 12/939,071. Handle grip 238 may be configured to permit manipulation of the apparatus by a diver and/or an ROV. Handle grip 238 may allow a diver to align a gasket without placing the diver's hands between the opposing flanges.

Embodiments of the present invention may include a clamp wire 242 attachable to the cradle 210 and the top portion 236. Clamp wire 242 may be secured to the cradle 210 and passed through a clamp aperture 244 of the top portion 236. Clamp wire 242 may be utilized to secure a gasket 22 between the cradle 210 and the top portion 236. See, e.g., FIG. 5. Clamp wire 242 may be cut allowing top portion 236 to rotate relative to the cradle 210. When clamp wire 242 is cut and top portion 236 is rotated such that gasket 22 is no longer secured between top portion 236 and the cradle 210, the cradle 210 may then be rotated as described in reference to FIG. 3.

Figure 7:
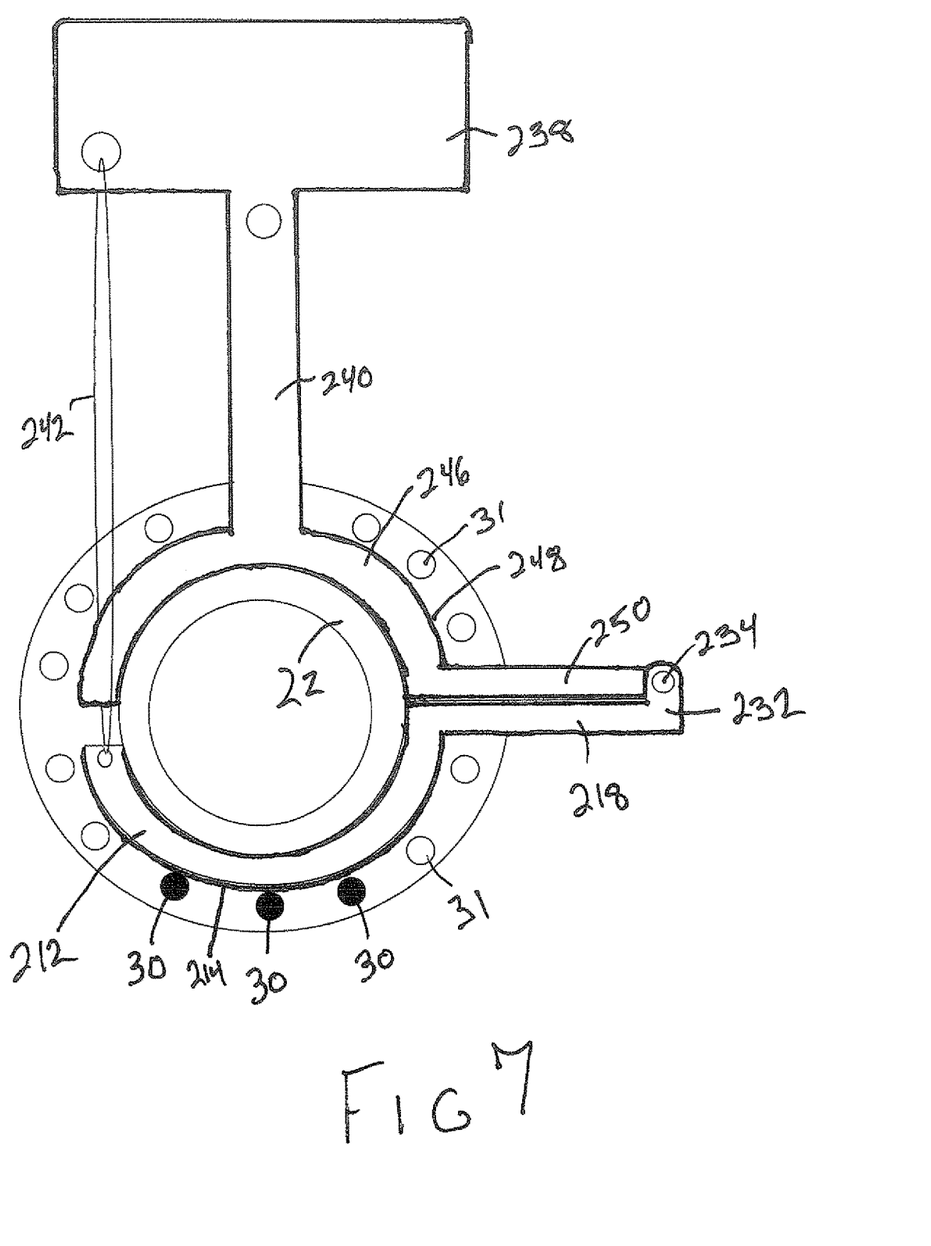
FIG. 7 is a front view of a gasket insertion apparatus and half of a flange assembly according to an exemplary embodiment of the present invention.
Figure 8:
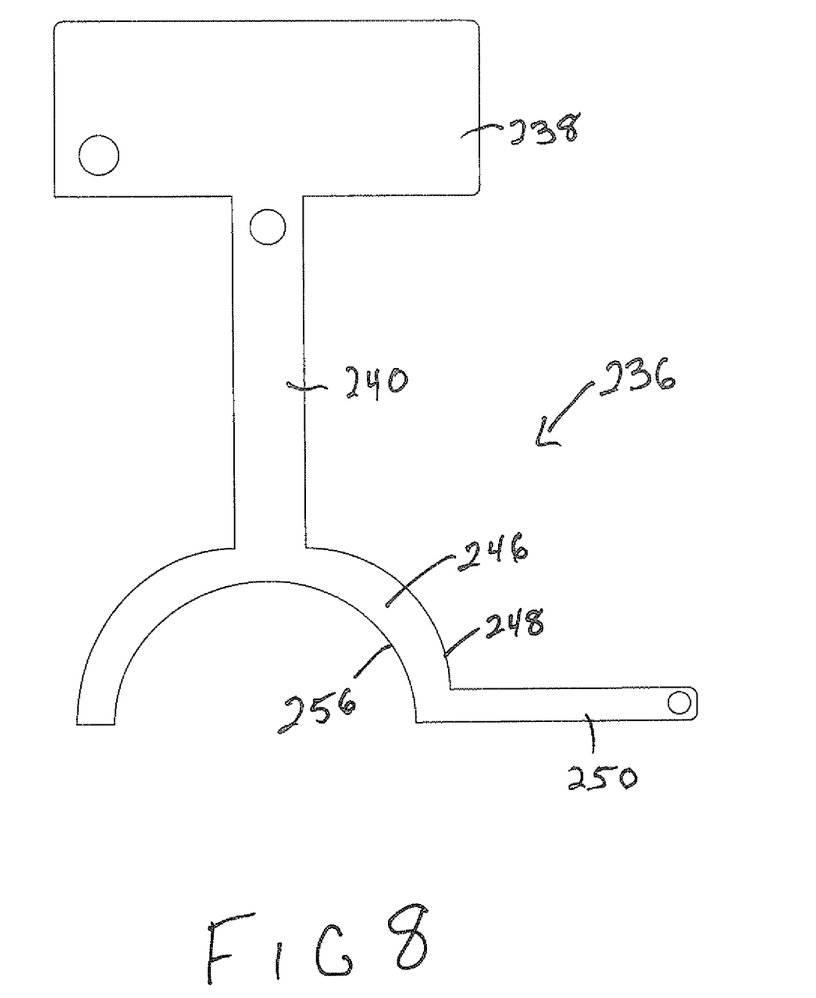
FIG. 8 is a front view of a top portion of a gasket insertion apparatus according to an exemplary embodiment of the present invention.
Figure 9:
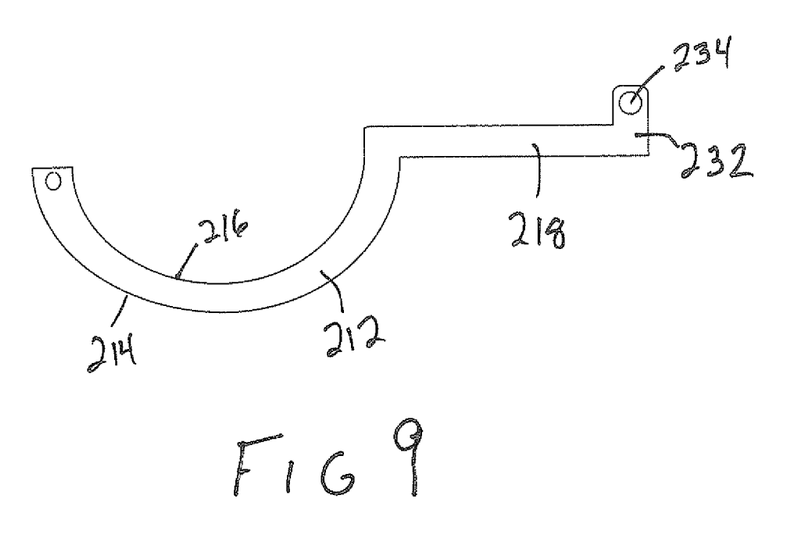
FIG. 9 if a front view of bottom portion of a gasket insertion apparatus according to an exemplary embodiment of the present invention.

FIG. 7 shows an embodiment of the present invention having top portion 236 and clamp wire 242 securing gasket 22 within the apparatus. As shown, exterior edge 214 rests upon bolts 30 passed through bolt apertures 31 located on a bottom portion of the flange. In this position, gasket 22 is aligned for proper installation. Once gasket 22 partially fits within ring groove 28 (not shown in FIG. 7), clamp wire 242 may be cut and the apparatus may be removed from the flange assembly.

Cradle 210 and top portion 236 may be made of any structurally suitable material, for example, aluminum or aluminum alloys, steel, stainless steel, mild steel, polymeric composites, sheet metal, and industrial laminates. In some embodiments, the shape of bottom frame 212 and/or top frame 246 may be any of a curve, an arc, a semicircle, or any other shape appropriate to match the contour of a gasket contained therein.

According to an exemplary embodiment of the present invention, a method is provided using cradle 10 (or 210) to insert gasket 22 into a closed faced connection flange or similar flange assembly having little or no space for any part of the apparatus to remain in the completed assembly. Cradle 10 may be positioned between opposing flanges of a flange assembly such that cradle 10 rests upon connection bolts 31 partially connecting a bottom portion of adjacent pipe pieces. Gasket 22 may be placed within cradle 10 such that it rests upon an interior edge 16 of a bottom frame 12. A width W between interior edge 16 and exterior edge 14 of the bottom frame 12 is configured such that gasket 22 is properly aligned when cradle 10 rests upon connection bolts 30. Opposing flanges of the flange assembly may be brought together until gasket 22 is partially within ring grooves of the opposing flanges. Cradle 10 may then be rotated until bottom frame 12 is no longer in contact with any of the connector bolts 30. At that point, cradle 10 may be removed from the flange assembly and the connection of the opposing flanges may be completed.

Certain embodiments of the present invention may include securing gasket 22 between cradle 210 and a top portion 236 prior to placing the cradle 210 between the opposing flanges. Embodiments may include securing cradle 210 and top portion 236 together via a clamp wire 242. Clamp wire 242 may be cut when gasket 22 is partially within ring grooves of the opposing flanges. Once the clamp wire 242 is cut, top portion 236 may be rotated relative to cradle 210 until cradle 210 may be rotated free of connection bolts 30 and removed from the flange assembly.

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted. The specification and drawings are accordingly to be regarded in an illustrative rather than in a restrictive sense.

What is claimed is:

1. A gasket insertion apparatus, comprising:
   a cradle including a first member having a first curved surface forming a first arc of a first circle;
   a top portion including a second member having a second curved surface forming a second arc of a second circle, the top portion further including a second arm connected to the second member and extending radially away from the second member;
   a first arm connected to the first member and extending radially away from the first member; and
   a clamp wire configured to secure the cradle and the top portion in a closed position around the gasket;
   wherein the cradle and the top portion are attached at a hinge point such that the top portion and the cradle rotate relative to each other; and wherein the first curved surface and the second curved surface are opposite each other and are configured to secure a gasket there between.

2. The gasket insertion apparatus of claim 1, wherein the first member comprises: a bottom frame that is substantially flat and curved, the bottom frame having an interior edge inside the curvature of the bottom frame and an exterior edge outside the curvature of the bottom frame.

3. The gasket insertion apparatus of claim 1, wherein the second member comprises: a top frame portion that is substantially flat and curved, the top frame portion having an interior edge inside the curvature of the top frame portion and an exterior edge outside the curvature of the top frame portion.

4. The gasket insertion apparatus of claim 1, wherein at least a portion of the first member has a width configured to align the gasket within a flange assembly when the gasket is in contact with the first curved surface and the first member rests upon at least two connector bolts of the flange assembly.

5. The gasket insertion apparatus of claim 4, wherein the width is approximately equal to a distance between a bolt aperture and a ring groove of a flange of the flange assembly.

6. The gasket insertion apparatus of claim 1, further comprising: a hinge extension connected to a distal end of the first arm.

7. The gasket insertion apparatus of claim 1, further comprising: a hinge extension connected to a distal end of the second arm.

8. The gasket insertion apparatus of claim 6, further comprising: hinge apertures located in the hinge extension and the distal end of the second arm.

9. A gasket insertion apparatus, comprising:
a first member having:
a bottom frame;
a first arm connected to the bottom frame and extending radially away from the bottom frame;
a top portion connected to the first member at a hinge point such that the top portion may rotate relative to the first member; and
a clamp wire configured to secure the first member and the top portion in a closed position around the gasket;
wherein the bottom frame has a first curved surface, the bottom frame having an interior edge inside the curvature of the first curved surface and an exterior edge outside the curvature of the first curved surface;
wherein the top portion comprises a top frame portion having a second curved surface, the top frame portion having an interior edge inside the curvature of the second curved surface and an exterior edge outside the curvature of the second curved surface;
wherein the bottom frame is configured to align a gasket when the gasket is in contact with the interior edge of the first curved surface and the exterior edge of the first curved surface is in contact with at least two bottom connector bolts of a partially connected flange assembly; and
wherein the top portion and the first member are configured to secure a gasket there between.

10. The gasket insertion apparatus of claim 9, further comprising: a hinge extension connected to a distal end of the first arm.

11. The gasket insertion apparatus of claim 10, further comprising: hinge apertures located in the hinge extension and a distal end of a second arm extending radially away from the top frame portion.

* * * * *